June 11, 1929.  G. ZINGGELER  1,716,941
SAW BLADE HOLDER
Filed Nov. 16, 1928
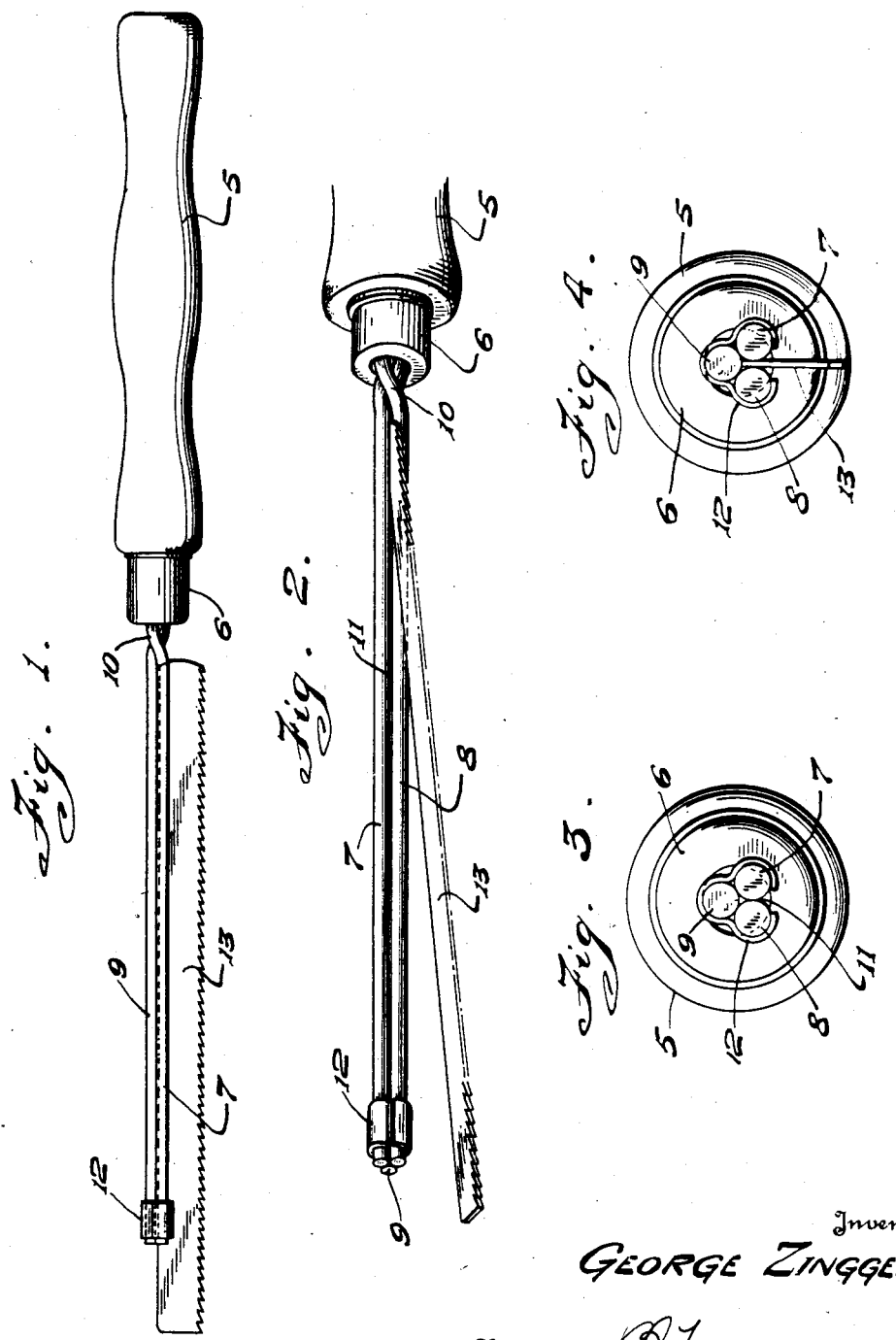
Inventor
GEORGE ZINGGELER
By
Attorney Patented June 11, 1929.

1,716,941

UNITED STATES PATENT OFFICE.

GEORGE ZINGGELER, OF ROCHESTER, NEW YORK.

SAW-BLADE HOLDER.

Application filed November 16, 1928. Serial No. 319,933.

The present invention relates to means for holding saw blades, preferably hacksaw blades, so that they may be employed for cutting small articles or nicking wires and the like. The device is peculiarly useful in connection with electrical work, but of course is not necessarily limited thereto. The object is to provide a simple, inexpensive article of manufacture that will constitute an effective holder for a saw blade and will permit the blades to be readily removed and replaced.

In the accompanying drawings:

Figure 1 is a side elevation of the preferred embodiment of the invention, and showing a saw blade in place.

Figure 2 is a detail perspective view illustrating how the blade may be introduced and removed.

Figure 3 is an end elevation with no blade in place.

Figure 4 is a similar view to Figure 3, but showing a blade in the holder.

In the embodiment disclosed, a suitable handle 5 is provided, which may be of any desired form, so that it can be conveniently gripped. Projecting from a ferruled end 6 of this handle are three rods or wires 7, 8 and 9 that are preferably relatively heavy and of some resiliency. Adjacent to the handle they are preferably twisted, as shown at 10, but throughout the remainder of their lengths they are disposed in parallel relation. The two rods 7 and 8 form between them a channel 11 and the third rod 9, nested in the space behind the two rods 7 and 8, constitutes the rear wall of said channel. The free ends of the three rods are bound together by a spring clip 12, the ends of which, however, are located on opposite sides of the channel 11 and thus leave it unobstructed.

The rods are preferably of a length and nearly, if not quite, equal to the length of an ordinary working saw blade shown at 13. The blade is held in place merely by forcing its rear portion into the channel 11 and abutting it tightly into the front end of the twisted portion 10. As a consequence the side rods 7 and 8 frictionally grip the blade and it is prevented from being pressed backwardly too far by the rear rod 9. The inner or rear end of the blade 13 is pinched in the twisted portions 10 of the rods, and the clip 12 at the free end serves to press the free ends of the rods firmly against opposite sides of the blade. The blade is thus rigidly secured in the holder and will maintain its position during any ordinary sawing operation. To remove the blade the free end which projects beyond the rods is pulled laterally from between the same, thus disengaging the main body, after which the pinched rear end can be readily detached, all as indicated in Figure 2.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. A saw blade holder comprising a handle, a blade holding shank comprising longitudinal side rods located side by side and adapted to receive between them and grip the blade of a saw, and a rod that lies behind the two side rods and in the rear of the channel between said two side rods and constitutes a back for the blade, said rods being all fixedly secured at one end to the handle.

2. A saw blade holder comprising a handle, a blade holding shank comprising longitudinal side rods located side by side and adapted to receive between them and grip the blade of a saw, a separate rod that lies behind the side rods and in the rear of the channel between said two side rods and constitutes a back for the blade, and a binder embracing and engaging the three rods and leaving the space between the side rods open, said rods being all fixedly secured at one end to the handle.

3. A saw blade holder comprising a handle, three rods extending side by side from the handle and having their portions adjacent the handle twisted, two of said rods forming a saw blade receiving channel between them, the third rod lying behind the first two and constituting a back abutment for the blade, and a clip embracing the free ends of the rods and leaving said channel open.

In testimony whereof, I affix my signature.

GEORGE ZINGGELER.